United States Patent [19]
Schipper

[11] Patent Number: 5,828,694
[45] Date of Patent: Oct. 27, 1998

[54] DETERMINATION OF MULTIPATH TRACKING ERROR

[75] Inventor: John F. Schipper, Palo Alto, Calif.

[73] Assignee: Trimble Navigation Limited, Sunnyvale, Calif.

[21] Appl. No.: 672,977

[22] Filed: Jul. 1, 1996

[51] Int. Cl.⁶ .............................. H04B 1/707; H04L 7/00
[52] U.S. Cl. ........................ 375/208; 375/367; 342/357; 342/450
[58] Field of Search .................................. 375/200, 206, 375/208, 209, 210, 224, 226, 362, 365, 367, 368; 342/357, 378, 450, 457

[56] References Cited

U.S. PATENT DOCUMENTS

| | | | |
|---|---|---|---|
| 4,007,330 | 2/1977 | Winters | 375/330 |
| 4,168,529 | 9/1979 | Tomlinson | 364/715.11 |
| 4,203,070 | 5/1980 | Bowles et al. | 375/317 |
| 4,203,071 | 5/1980 | Bowles et al. | 375/343 |
| 4,550,414 | 10/1985 | Guignon et al. | 375/207 |
| 4,608,569 | 8/1986 | Dickey et al. | 342/384 |
| 4,660,164 | 4/1987 | Leibowitz | 364/728.03 |
| 4,829,543 | 5/1989 | Borth et al. | 375/329 |
| 4,862,478 | 8/1989 | McIntosh | 375/200 |
| 5,041,833 | 8/1991 | Weinberg | 342/357 |
| 5,091,918 | 2/1992 | Wales | 375/229 |
| 5,101,416 | 3/1992 | Fenton et al. | 375/206 |
| 5,164,959 | 11/1992 | Cai et al. | 375/200 |
| 5,282,228 | 1/1994 | Scott et al. | 375/344 |
| 5,343,209 | 8/1994 | Sennott et al. | 342/357 |
| 5,347,536 | 9/1994 | Meehan | 375/210 |
| 5,390,207 | 2/1995 | Fenton et al. | 375/209 |
| 5,402,450 | 3/1995 | Lennan | 375/343 |
| 5,414,729 | 5/1995 | Fenton et al. | 375/209 |
| 5,420,592 | 5/1995 | Johnson | 342/357 |
| 5,444,451 | 8/1995 | Johnson et al. | 342/453 |
| 5,481,503 | 1/1996 | Kuhn et al. | 367/100 |
| 5,488,662 | 1/1996 | Fox et al. | 380/34 |
| 5,493,588 | 2/1996 | Lennen | 375/343 |
| 5,495,499 | 2/1996 | Fenton et al. | 370/479 |
| 5,526,378 | 6/1996 | Knutson et al. | 375/229 |
| 5,537,121 | 7/1996 | Lennen | 342/357 |
| 5,671,221 | 9/1997 | Yang | 370/320 |
| 5,706,314 | 1/1998 | Davis et al. | 375/340 |

OTHER PUBLICATIONS

R.E.Ziemer and R.L.Peterson, Digital Communications And Spread Spectrum Systems, MacMillan Publ., New York, 1985, pp. 419–447.

Townsend and Fenton, "A Practical Approach to the Reduction of Pseudorange Multipath Errors in a L1 GPS Receivers", Proceedings of ION GPS–94 (Salt Lake City, Utah, 20–23 Sep. 1994), pp. 143–148.

Montsolvo and Brown, "A Comparison of Throc Multipath Miltigation Approaches for GPS Receivers", Proceedings of ION GPS–95 (Palm Springs, CA, 12–15 Sep. 1995) pp. 1511–1520.

Townsend, B., Fenton, P., Van Dierendonck, K., and van Nee, R., "L1 Carrier Phase Multipath Error Reduction Using MEDLL Technology," in PROC. ION GPS–95, pp. 1539–1544., Sep. 1995.

*Primary Examiner*—Stephen Chin
*Assistant Examiner*—Jeffrey W. Gluck
*Attorney, Agent, or Firm*—John Schipper

[57] ABSTRACT

Methods for estimating the tracking error in estimated time of arrival of a composite incoming signal that contains a known, digital, spread spectrum signal $S_A(t)$ and that may contain one or more multipath signals whose source is the known signal. Some methods use linear, quadratic or other approximations for the measured correlation function $AC(\tau)$ for the early and late regions of the time shift variable $\tau$ (separated by a punctual value $\tau = t_P$). Other methods require only knowledge of the measured correlation function $AC(\tau)$ for one or two time shift values in the early region $\tau < t_P$.

17 Claims, 2 Drawing Sheets

DETERMINATION OF MULTIPATH TRACKING ERROR

FIELD OF THE INVENTION

This invention relates to estimation of error in time of arrival of a composite, digital spread spectrum signal that contains multipath signals.

BACKGROUND OF THE INVENTION

The effects of multipath are well known in communications systems.

Multipath is the term used to define the secondary signals that are locally induced reflections of a primary signal that enter the receiver in question a fraction of a second later than the direct path signal, and because of the relatively short delay between the original signal and the secondary signal, induce a type of destructive interference that results in some type of impairment to the desired signal. In analog FM band automobile receivers, the effects of multipath create an annoying flutter that causes a loss of intelligibility. In television signals, the impairment is called a "ghost" image. A similar impairment occurs in other forms of analog communication. In digital systems, whether for speech or for data transmission for other purposes, multipath basically adds noise to the desired signal, resulting in either outright errors or, at least, much noisier data. In spread spectrum receivers, the effects of multipath are generally found in the correlators used to achieve signal timing synchronization. In GPS or GLONASS receivers, which seek to determine location based on triangulation of range distances determined from time delay measurements made from an orbiting constellation of satellites, the effect of multipath is to induce comparatively large instantaneous errors in the time of arrival measurements which translate into large errors in the indicated positions. Removal of these errors is the subject of most of the work done by previous workers in this field. Previous researchers have sought to deal with the effects of multipath by attempting to estimate the magnitude of the error introduced, and to subtract this error or to otherwise compensate for its effects.

The methods employed to acquire and demodulate data from spread spectrum transmissions are well known in the art. See R. E. Ziemer and R. L. Peterson, *Digital Communications and Spread Spectrum Systems*, Macmillan Publ Co., New York, 1985, pp. 419–447 for a discussion of acquisition and demodulation of spread spectrum signals. A spread spectrum GPS receiver must obtain both code and carrier synchronization in order to demodulate the desired data successfully. Issues associated with tracking and accurately demodulating a spread spectrum signal, once the signal is acquired, are discussed in many references on GPS, such as Alfred Leick, *GPS Satellite Surveying*, John Wiley & Sons, New York, Second Edition, 1995, and Ziemer and Peterson, op cit.

A GPS signal contains a 50 bit/second navigation message and a unique spreading code (C/A) of length 1.023 kilobits, which is transmitted at a frequency of about 1.023 Mbits/sec. Signal acquisition requires that phase lock first occur with the radio frequency carrier and that the reference or local replica signal be synchronized with the spreading code. In signal synchronization, a local replica of the particular satellite code is synchronized in time with the incoming satellite signal code.

Once the Doppler error in the downlink signal from the satellite is appropriately compensated for and signal synchronization is obtained, the navigation message in the 50 bit/second modulation that forms the composite GPS signal (direct plus multipath) can be demodulated. This navigation message contains data on the satellite ephemerides and time pulses that indicate when the transmission originated from the satellite. By measuring the difference between the local clock time and the indicated satellite time of transmission, the time delay, and thus the instantaneous distance from GPS receiver to satellite, can be obtained by multiplying this time delay by the speed of light in the ambient medium.

Signal synchronization is performed using a signal correlator. The correlator constantly compares the incoming signal s(t) with a local replica of the desired signal; a microprocessor adjusts a time shift $\tau$ of the local replica signal until satisfactory agreement is obtained. Because the incoming signal and the local replica signal are substantially identical, a measure of the degree of agreement of these two signals is often referred to as a correlation function. A variety of correlation functions $AC(\tau)$ are shown in various texts. According to one approach, a measured correlation function $AC(\tau)$ is formed according to the prescription $$AC(\tau) = \int_0^T s(t')S_d(t' + \tau)dt', \text{ or} \tag{1A}$$

$$AC(\tau) = \sum_{i=1}^{I} s(t_i)S_d(t_i + \tau), \tag{1B}$$

depending upon whether integration or summation of sampled values over a suitable contribution time interval is used to compute the measured correlation function. Here $\tau$ is a time shift variable used to study the degree of correlation between the incoming signal and the local replica signal, and $\{t_i\}(i=1, 2, \ldots, I; I \geq 2; t_I - t_1 \leq T)$ is a selected sequence of time values in a region where the composite signal is likely to arrive. The length T of the contribution time interval used to compute the measured correlation function $AC(\tau)$ in Eq. (1A) or (1B) is often chosen to be $N\Delta t_{chip}$, where N is a large positive number and $\Delta t_{chip}$ is the length of the minimum time interval over which a digital signal can remain constant, referred to as the bit time interval or chip width herein.

Tracking the composite satellite signal requires maintaining signal synchronization. The peak of the correlation function is rounded, not pointed, due to finite bandwidth effects, so that locating a true peak is difficult. Receiver designers have, therefore, resorted to an "early-minus-late" correlation tracking method, as discussed by W. M. Bowles in "Correlation Tracking," Charles Stark Draper Laboratory, May 1980, by Fenton et al. in U.S. Pat. No. 5,101,416, and by Lennen in U.S. Pat. Nos. 5,402,450 and 5,493,588. In the early-minus-late tracking method, a first correlator measures an equivalent correlation function when the local replica signal is shifted to an "early" time $t_E$ relative to the position ($\tau = t_P$) of an ideal or punctual replica, and a second correlator measures a second equivalent correlation function when the local replica signal is shifted to a "late" time $t_L$. A correlation difference function is formed from the early and late correlation functions and analyzed. The invention disclosed herein does not require use of a correlation difference function.

Superposition of an equivalent correlation function for the multipath signal (reduced in magnitude and delayed in time) onto the measured correlation function $AC(\tau)$ for the desired satellite code signal is a useful model for analyzing the effects of presence of multipath signals, as noted in the Fenton et al. patent and in the Lennen patents, op. cit. Superposition of any additional signal onto the desired local replica signal that is part of the incoming signal, during the time period when signal correlation is computed, will distort the desired correlation function AC(τ;direct) and produce an altered correlation function AC(τ;composite) for the composite signal (direct plus multipath). A correlation function for an uncorrupted or "pure" direct signal (broken line curve) plus a representative, attenuated and time delayed, multipath signal with positive relative polarity, compared to the direct signal, is shown in FIG. 1A. FIG. 1B shows an analogous correlation function where the multipath signal has negative relative polarity compared to the direct signal. Presence of one or more multipath signals in the incoming signal will usually produce an error in the true time of arrival $t=t_{0,P}$ of the direct signal, if the peak time $t=t_P$ is used to estimate this time of arrival.

Previous work in the area of multipath amelioration has focussed on two approaches: 1) estimating the effects and compensating for multipath-induced errors, and 2) attempting to limit the effects of the estimated multipath errors. In the Lennen patents, op. cit., both approaches are described. The estimation methods seek to model the distortions to the instantaneous correlation function and to create a correction term to subtract from the indicated punctual time. Estimation methods are worthwhile but can never obtain perfection, wherein all multipath effects are removed, because the multipath signals are constantly varying and corrections can only be made after the fact.

A multipath limitation method, such as described in the Lennen patents, op. cit., operates the early-minus-late correlation tracking loop with a shorter delay between the early signal and late signal correlators than previous methods usually employed, as small as $0.01 \, \Delta t_{chip}$–$0.15 \, \Delta t_{chip}$. This limitation method reduces the effects of the presence of multipath substantially.

Several workers have analyzed correlation functions and/or have used pseudorandom signal sequences in attempting to estimate or suppress the effects of the presence of multipath signals. Examples of these are Winters in U.S. Pat. No. 4,007,330, Tomlinson in U.S. Pat. No. 4,168,529, Bowles et al. in U.S. Pat. Nos. 4,203,070 and 4,203,071, Guignon et al. in U.S. Pat. No. 4,550,414, Dickey et al. in U.S. Pat. No. 4,608,569, Liebowitz in U.S. Pat. No. 4,660, 164, Borth et al. in U.S. Pat. No. 4,829,543, McIntosh in U.S. Pat. No. 4,862,478, Wales in U.S. Pat. No. 5,091,918, Fenton et al. in U.S. Pat. Nos. 5,101,416, 5,390,207, 5,414, 729 and 5,495,499, Cai et al. in U.S. Pat. No. 5,164,959, Scott et al. in U.S. Pat. No. 5,282,228, Meehan in U.S. Pat. No. 5,347,536, Lennen in U.S. Pat. Nos. 5,402,450 and 5,493,588, Johnson et al in U.S. Pat. No. 5,444,451, Kuhn et al. in U.S. Pat. No. 5,481,503, and Fox et al. in U.S. Pat. No. 5,488,662.

In "A Practical Approach to the Reduction of Pseudorange Multipath Errors in a L1 GPS Receiver," Institute of Navigation Meeting Proceedings, pp. 143–148 (20–23 Sep. 1994), Townsend and Fenton briefly present an interesting approach to determining what they refer to as "tracking error" ΔT:

$$\Delta T = \{y1 - y2 + (d/2)(a1 + a2)\}/(a1 - a2). \tag{2}$$

Here, y1 and y2 are values of the measured correlation function AC(τ) at an "early" point $\tau=\tau_{early}$ and at a "late" point $\tau=\tau_{late}$, a1 and a2 are the estimated values of the slopes of the measured function AC(τ) at $\tau=\tau_{early}$ and at $\tau=\tau_{late}$, and $d=\tau_{late}-\tau_{early}$. Equation (2) appears to assume that the true peak time is located at a central point, such as τ=0, rather than being generally located; this approach may be of limited utility in estimating a multipath tracking error in general situations.

In previous methods for multipath amelioration, the measured correlation function AC(τ) and/or a correlation difference function ΔAC(τ) are formed and analyzed for many values on both sides of the peak value $\tau=t_P$ for the measured function, and relatively little use is made of knowledge of the measured correlation function AC(τ;0) for the direct or local replica signal with itself. What is needed is an approach that is not subject to these limitations and that provides a simpler technique for estimating the multipath tracking error based on the measured correlation function.

SUMMARY OF THE INVENTION

These needs are met by the invention, which includes several embodiments for estimating the multipath tracking error, using measurement of the value and the slope of the measured correlation function at one or two values of the time shift variable τ. In some of the embodiments, the value and the slope of the measured correlation function AC(τ) are determined for two points, $\tau=\tau1$ and $\tau=\tau2$ ($\tau1<t_P<\tau2$), and the measured correlation function is approximated by a linear, quadratic or other approximating function of the time shift variable τ to estimate multipath tracking error $\Delta t_P = t_P - t_{0,P}$, where $t_P$ is the measured time shift value for maximum measured correlation and $t_{0,P}$ is the unknown time of arrival of the direct signal. In other embodiments, the value and slope of the measured correlation function AC(τ) for only one time shift value $\tau=\xi1<t_P$ are needed to estimate the multipath tracking error $\Delta t_P$.

DESCRIPTION OF BEST MODES OF THE INVENTION

Figure 1A:
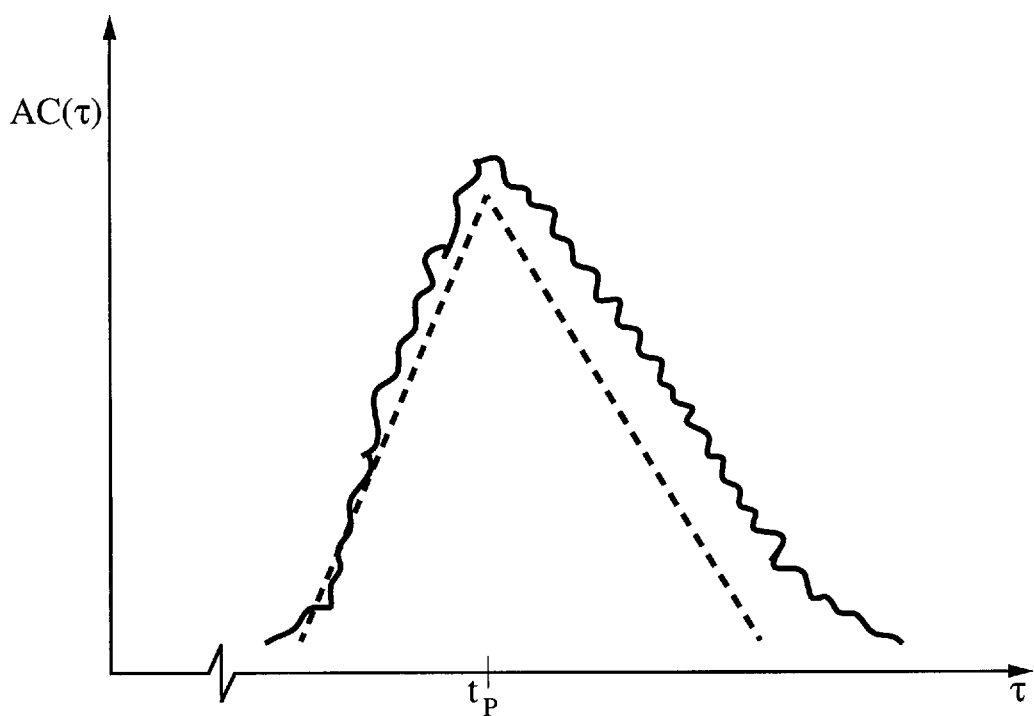
FIGS. 1A and 1B illustrate the effects on a correlation function of presence in an incoming signal of a multipath signal with relative positive polarity and relative negative polarity, respectively.
Figure 1B:
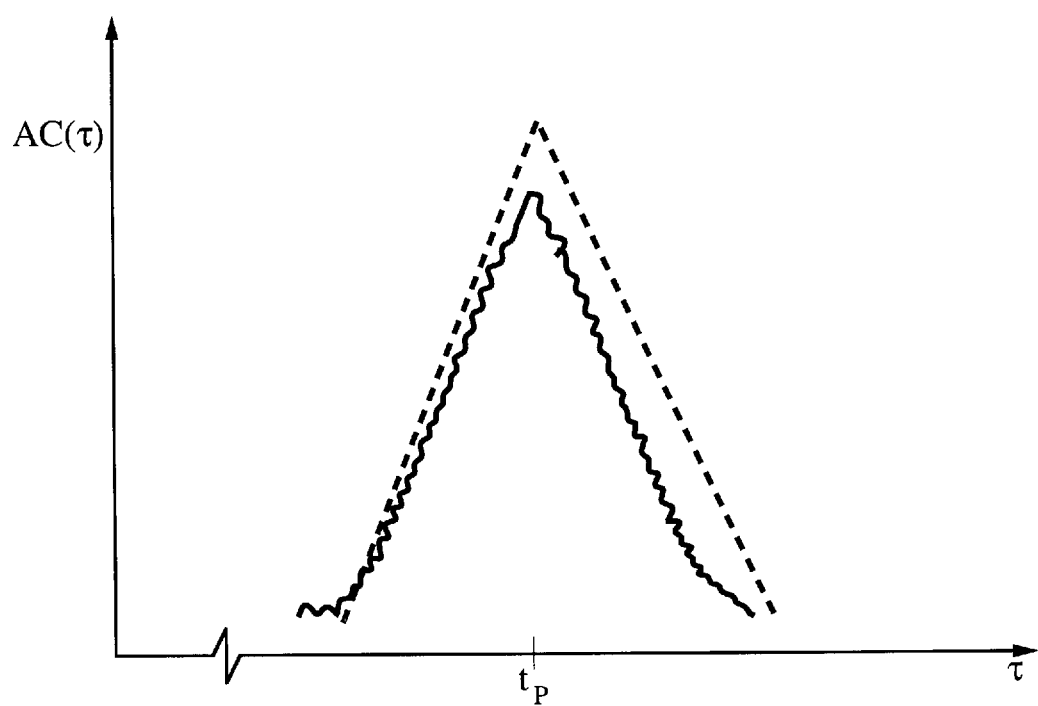

Assume that a composite, spread spectrum, digital signal s(t), containing a desired direct signal $S_d(t)$ and one or more undesired multipath signals $S_m(t)$, arrives at a receiver and that the direct signal time of arrival $t_{0,P}$ is to be estimated. The receiver or an associated computer contains the digital pattern for a time shifted version $S_d(t-\tau)$ of the direct signal, where τ is an arbitrary time shift value. One first forms a measured correlation function AC(τ) for the composite signal, defined by Eq. (1A) or Eq. (1B) above, or defined in any other suitable manner.

Where one or more multipath signals $S_m(\tau)$ are present in the arriving composite signal s(t), the measured correlation function AC(τ) may appear as in FIG. 1A or as in FIG. 1B, if the (dominant) multipath signal has positive relative polarity or negative relative polarity, respectively. For purposes of illustration, the correlation function in FIG. 1A is examined here. The analysis of FIG. 1B is analogous and yields the same analytical results.

Figure 2:
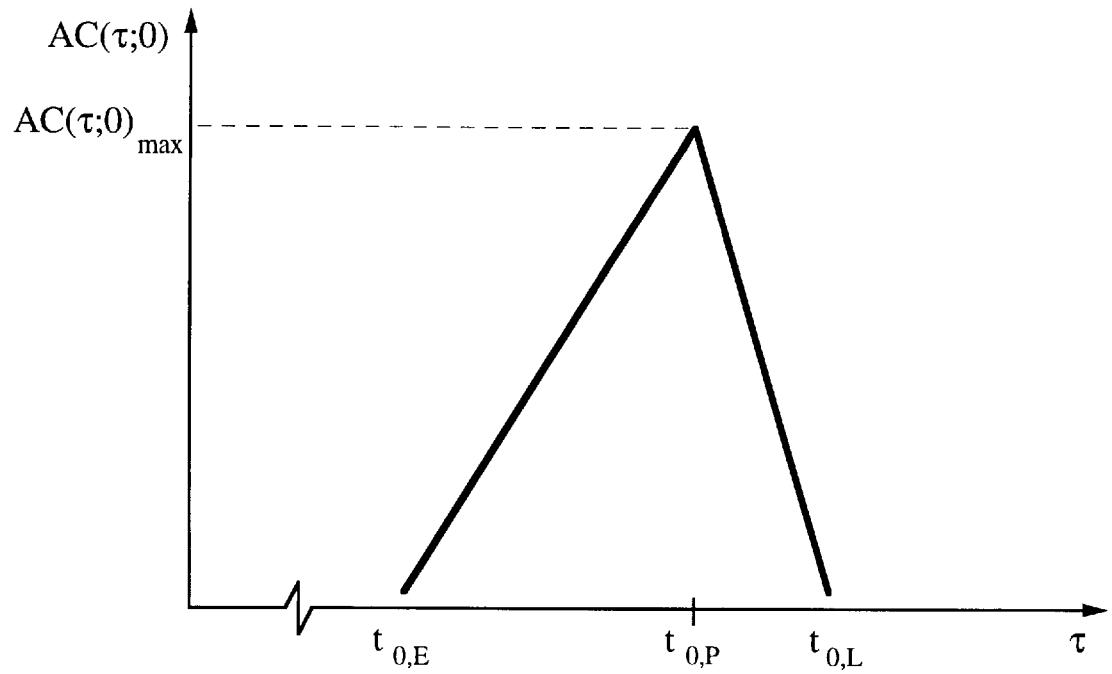
FIG. 2 illustrates a correlation function formed from a known digital spread spectrum signal with itself.

If the incoming composite signal s(t) contains no multipath signals, and if receiver noise, transmitter noise and all other sources of signal error are removed, a "pristine" or reference correlation signal AC(τ;0) would be measured, as shown in FIG. 2. Here $\tau=t_{0,E}$ and $\tau=t_{0,L}$ are the time shift values for which the reference function $AC(\tau;0)$ is approximately zero and $\Delta t_{chip}=(t_{0,L}-t_{0,E})/2$ is the chip width of the spread spectrum digital signal. The reference correlation function is defined approximately by $$AC(\tau;0) = b(\tau - t_{0,E}) \quad (t_{0,E} < \tau < t_{0,P} = t_{0,E} + \Delta t_{chip}) \quad (3A)$$
$$= b(t_{0,L} - \tau) \quad (t_{0,P} < \tau < t_{0,L}), \quad (3B)$$

where $\tau=t_{0,P}$ is a time shift value (unknown as yet) for which the reference function $AC(\tau;0)$ attains its maximum value and b is a known slope value for the reference function. In a practical situation, as noted above, an uppermost portion of the reference function $AC(\tau;0)$ is rounded rather than having a sharp corner near $\tau=t_{0,P}$ and $AC(t_{0,P};0)\approx (b\Delta t_{chip}-t_{0,E})$, because of the finite bandwidth of one or more filters used to process the incoming signal s(t) and/or the direct signal $S_d(t)$.

The measured correlation function $AC(\tau)$ will also have an identifiable or estimable peak, at a time shift value $\tau=t_P$ that is expected to be displaced from the true value $\tau=t_{0,P}$ (unknown) by a multipath tracking error $\Delta t_P=t_P-t_{0,P}$ that is to be determined. The error $\Delta t_P$ may be positive, negative of zero. Approximate slope values or the measured correlation function $AC(\tau)$ for an "early" region, defined by $\tau<\tau'$, and for a "late" region, defined by $\tau>\tau'$, are determined at two time shift values $\tau=\tau 1<\tau'$ and $\tau=\tau 2>\tau'$. Here $\tau'$ is an intermediate value of the time shift variable that is "nearer" to the peak value in the sense that $AC(\tau 1)<AC(\tau')$ and $AC(\tau 2)<AC(\tau')$. One can use the measured or estimated value $\tau'=t_P$ if desired.

In practical situations, a multipath signal arrives after the direct signal that acts as a source of the multipath signal so that the late region of the measured correlation function $AC(\tau)$ ($\tau>\tau'$) is likely to be distorted more than the early region ($\tau<\tau'$) of this function. The reference correlation function $AC(\tau;0)$ shown in FIG. 2 can be represented for a selected range of time shift values $\tau$ in the early region as $$AC(\tau;0)=a+b\tau (t_{0,E}<\tau<t_{0,P}) \quad (4)$$

where the initial point, at which $AC(t_{0,E};0)=0$, is given by $$\tau=t_{0,E}=-a/b. \quad (5)$$

Here b is the "true" or known slope value of the early region of the reference correlation function $AC(\tau;0)$ from Eqs. (3A) or (3B), but the value a, and thus the initial point value $t_{0,E}$, is not yet known.

In a first embodiment, a value $\tau=t_P$ for the time shift variable for which the measured correlation function $AC(\tau)$ is near or at a local maximum or absolute maximum is measured or estimated, and a corresponding time shift value $t_E=t_P-\Delta t_{chip}$ is computed for the function $AC(\tau)$. If the incoming signal s(t) has no distorting component, the measured correlation function will coincide with the reference correlation function and will be substantially zero at the initial point $\tau=t_E=t_P-\Delta t_{chip}$. The difference $$\Delta t_P=\Delta t_E=t_E-t_{0,E}=t_P-\Delta t_{chip}+a/b \quad (6)$$

is then a reasonable estimate of the tracking error in the presence of one or more multipath signals.

In a second embodiment, the time shift value $\tau=t_P$ in Eq. (6) is replaced by another approximation, $\tau=\tau'$, and the estimated tracking error becomes $$\Delta t_P=\Delta t_E=\tau'-\Delta t_{chip}+a/b. \quad (7)$$

In a third embodiment, the measured correlation function, for a range of values of the time shift variable $\tau$ in the early region, written $AC(\tau;E)$, is approximated by a selected function $$AC(\tau;E)\approx f(\tau;E). \quad (8)$$

The function $f(\tau;E)$ is preferably, but not necessarily, monotonically increasing for $\tau$ in this range. A time shift value $\tau=t_{f,E}$ for which $$f(t_{f,E};E)=0 \quad (9)$$

is determined, and the tracking error is estimated as $$\Delta t_P=t_{f,E}+a/b, \quad (10)$$

by analogy with Eq. (6).

In a first version of the third embodiment, the approximating function $f(\tau;E)$ is chosen to be $$f(\tau;E)=a1+b1\tau, \quad (11)$$

and the estimated tracking error becomes $$\Delta t_P=a/b-a1/b1. \quad (12)$$

In a second version of the third embodiment, the approximating function is chosen to be $$f(\tau;E)=a1+b1\tau+c1\tau^2, \quad (13)$$

and the estimated tracking error becomes $$\Delta t_P=a/b-\{-b1\pm[(b1)^2-4\,a1\,c1]^{1/2}\}/(2c1), \quad (14)$$

where the plus sign or the minus sign for the square root component is chosen to yield the more realistic answer for the solution to the quadratic equation $$a1+b1\tau+c1\tau^2=0. \quad (15)$$

The approximation function $f(\tau;E)$ can be chosen to be any other function that offers a suitable approximation for the measured correlation function $AC(\tau)$ over a selected range in the early region $\tau<\tau'$.

The slope value b is known and fixed by the nature of the reference correlation function $AC(\tau;0)$ for the early region. The time shift value $\tau'$ may be chosen so that the absolute value of the slope difference $|b-(df/d\tau)_{\tau=\tau'}|$ is no greater than a selected small positive number $\delta b$, viz.

$$|b-(df/d\tau)_{\tau=\tau'}|\leq \delta b. \quad (16)$$

In a fourth embodiment, the measured correlation function $AC(\tau)$ for the early region, $AC(\tau;E)$ and the measured correlation function for the late region, $AC(t;L)$, are approximated by the respective functions $$AC(\tau;E)\approx f(\tau;E) \quad (t_E<\tau<\tau'), \quad (17A)$$

$$AC(\tau;L)\approx f(\tau;L) \quad (\tau'<\tau<t_L), \quad (17B)$$

A time shift value $\tau=t'_P$ for a computed peak of the measured correlation function is determined or estimated by setting $$f(t'_P;E)=f(t'_P;L), \quad (18)$$

which yields an estimate $t'_P$ for the peak time shift value of the measured correlation function. The estimated tracking error becomes $$\Delta t_P=\Delta t_E=t'_P-\Delta t_{chip}+a/b, \quad (19)$$

where Eq. (5) is used to determine the initial point for the reference correlation function $AC(\tau;0)$.

In a first version of the fourth embodiment, the linear functions $$f(\tau;E) = a1 + b1\tau \quad (t_E < \tau < \tau'), \tag{20A}$$

$$f(\tau;L) = a2 + b2\tau \quad (\tau' < \tau < t_L), \tag{20B}$$

are used for the approximation functions, and the computed peak point $\tau = t'_P$ becomes $$\begin{aligned} t'_P &= (a2 - a1)/(b1 - b2) \\ &= \{(a2 + b2\tau2) - (a1 + b1\tau1) - 0.5(b1 + b2)(\tau2 - \tau1) \\ &\quad + 0.5(b1 - b2)(\tau2 + \tau1)\}/(b1 - b2) \end{aligned} \tag{21B}$$

Note that this is not an estimate of the multipath tracking error itself. The estimated tracking error becomes $$\begin{aligned} \Delta t_P &= t'_P - t_{0,E} - \Delta t_{chip} \\ &= (a2 - a1)/(b1 - b2) + a/b - \Delta t_{chip}. \end{aligned} \tag{22}$$

Figure 3:
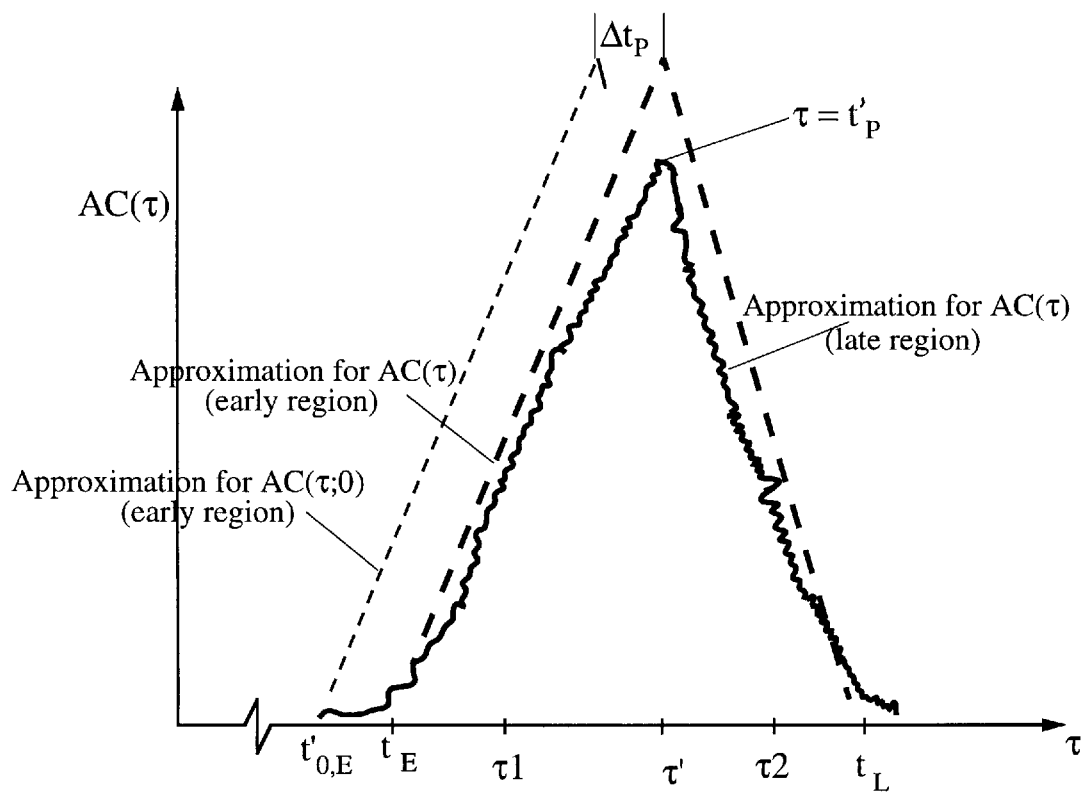
FIG. 3 illustrates a correlation function formed from an incoming signal with a known digital spread spectrum signal.

In a second version of the fourth embodiment, the early and late regions of the measured correlation function $AC(\tau)$ are approximated by the respective functions, $$f(\tau;E) = a1 + b1\tau + c1\tau^2, \tag{23}$$

$$f(\tau;L) = a2 + b2\tau + c2\tau^2, \tag{24}$$

as illustrated in FIG. 3, with $c2 - c1 \neq 0$. The peak time shift value $\tau = t_P$ is determined by equating the early region and late region quadratic functions, $$f(t'_P;E) = f(t'_P;L). \tag{25}$$

The computed peak point $\tau = t'_P$ becomes $$t'_P \{ -(b2-b1) \pm [(b2-b1)^2 - 4(a2-a1)(c2-c1)]^{1/2} \}/2(c2-c1) \tag{26}$$

The initial point $t_{0,E}$ for the early region of the reference correlation function $AC(\tau;0)$ is determined from Eq. (5), as before, and the tracking error becomes $$\begin{aligned} \Delta t_P &= t'_P - t_{0,E} - \Delta t_{chip} \\ &= \{-(b2 - b1) \pm [(b2 - b1)^2 - \\ &\quad 4(a2 - a1)((c2 - c1)]^{1/2}\}/2(c2 - c1) + a/b - \Delta t_{chip}. \end{aligned} \tag{27}$$

In a fifth embodiment, the magnitude of the tracking error is estimated by the relation $$\Delta t_P = \pm |t_P - t'_P|, \tag{28}$$

where $\tau = t_P$ is the estimated or exactly determined time shift value for which the measured correlation function $AC(\tau)$ achieves a peak value and the computed peak value $\tau = t'_P$ is determined in Eq. (25). At this point, the tracking error $\Delta t_P$ can have either sign. Selection of the plus sign or of the minus sign in Eq. (28) requires use of more information. For example, if a dominant multipath signal is present in the incoming composite signal $s(t)$ and has positive (negative) polarity relative to the direct signal $S_d(t)$, the quantity $\Delta t_P$ is more likely to be positive (negative) so that the plus sign (minus sign) is the better choice in Eq. (28). A dominant multipath signal, if present in the signal $s(t)$, is more likely to have positive relative polarity or negative relative polarity accordingly, as the peak value of the measured correlation function, $AC(t_P)$, satisfies $$AC(t_P) > AC(\tau;0)_{max} \tag{29A}$$

or $$AC(t_P) < AC(\tau;0)_{max}, \tag{29A}$$

respectively. The condition $\Delta t_P \geq 0$ may be more likely but is not guaranteed.

In a sixth embodiment, the tracking error is estimated by the relation $$\Delta t_P = t'_P + b/a - \Delta t_{chip}, \tag{30}$$

by analogy with the first and second embodiments.

In a seventh embodiment, the approximation function $f(\tau;E)$ is assumed to have a determinable time shift value $\tau = t'_E (\approx t'_P - \Delta t_{chip})$ for which $f(t'_E;E) = 0$. Proceeding by analogy with the third embodiment, the tracking error is estimated by the relation $$\Delta t_P = t'_E - t_{0,E} = t'_E + a/b, \tag{31}$$

where $t_{0,E}$ is determined from Eq. (5).

A polynomial of degree higher than two, or any other suitable trigonometric, rational or other approximating function, can be used in any of Eqs. (8), (17A), or (17B), but the computations of the value $\tau = t'_P$ become more complex. Once the value $\tau = t_{f,E}$ in Eq. (9) or $\tau = t'_P$ is determined in Eq. (18), estimation of the multipath tracking error $\Delta t_P$ proceeds as in the third, fourth, fifth, sixth or seventh embodiment. The preceding discussion assumes that the measured correlation function $AC(\tau)$ is positive near $\tau = t_P$. The analysis is also applicable for a negative measured correlation function, with $AC(\tau;0)_{max}$ replaced by $AC(\tau;0)_{min}$.

Any of these seven embodiments can be used to estimate the multipath tracking error $\Delta t_P$. The first, second and third embodiments do not require quantitative knowledge of the behavior of the measured correlation function in the late region. Any of the embodiments requires: (1) estimation of a time shift value $\tau = t_P$ or $t'_P$ for a relative or absolute peak correlation value or of an initial value $\tau = t_E$ or $t'_E$ for the measured correlation function; and (2) estimation of an initial value $\tau = t_{0,E}$ for the reference correlation function, using information for the early region of the measured and reference correlation functions. If the condition $$\Delta t_P \geq 0 \tag{32}$$

is imposed on the estimation, one or more of the preceding estimations of this quantity may be discarded because, for the particular measured correlation function $AC(\tau)$, Eq. (32) is not satisfied.

What is claimed is:

1. A method for estimating the correlation tracking error for a received composite signal that includes a distortion-free reference signal, the method comprising the steps of:

receiving an incoming signal $s(t)$ that includes a known, distortion-free, digital reference signal $S_d(t)$ having a selected bit value interval of $\Delta t_{chip}$, and that may include at least one signal that distorts the reference signal;

forming a measured correlation function $AC(\tau)$ between the incoming signal $s(t)$ and the known signal $S_d(t+\tau)$, where $\tau$ is a selected time shift value of the reference signal relative to the incoming signal;

selecting a first time shift value $\tau = \tau1$ for which there exists at least a second time shift value $\tau' > \tau1$ satisfying $AC(\tau') > AC(\tau1)$;

approximating the measured correlation function $AC(\tau)$ by a function $f(\tau)$ that satisfies $f(\tau) = 0$ at a determinable value $\tau = t_E$;

approximating a reference correlation function $AC(\tau;0)$ for the distortion-free signal for time shift values $\tau < \tau'$ by the relation $AC(\tau;0) \approx a + b\tau$, where b is a selected slope value and a is a selected number; and estimating a tracking error $\Delta t_P$ for the incoming signal $s(t)$ from the parameters a, b, $\tau1$, $\tau'$ and a knowledge of the function $f(\tau)$.

2. The method of claim 1, further comprising the step of estimating said tracking error by the relation $\Delta t_P = t_P + a/b - \Delta t_{chip}$, where $t_P$ is approximately equal to a value of $\tau$ for which said measured correlation function $AC(\tau)$ attains a maximum value.

3. The method of claim 2, further comprising the step of estimating said tracking error by the relation $\Delta t_P = \tau' + a/b - \Delta t_{chip}$.

4. The method of claim 1, further comprising the step of choosing said function $f(\tau)$ to be equal to $f(\tau) = a1 + b1\tau$, where b1 is a selected slope value and a1 is a selected value.

5. The method of claim 4, further comprising the step of estimating said tracking error by the relation $\Delta t_P = a/b - a1/b1$.

6. The method of claim 1, further comprising the step of choosing said function $f(\tau)$ to be equal to $f(\tau) = a1 + b1\tau + c1\tau^2$, where b1 is a selected slope value, a1 and c1 are selected values, and c1 is not zero.

7. The method of claim 6, further comprising the step of estimating said tracking error by at least one of the relations $$\Delta t_P = a/b - (-b1 + \{(b1)^2 - 4\, a1\, c1\}^{1/2}/2c1$$

and $$\Delta t_P = a/b - (-b1 - \{(b1)^2 - 4\, a1\, c1\}^{1/2}/2c1.$$

8. The method of claim 6, further comprising the step of selecting said time shift value $\tau 1$ to be equal to a value of $\tau$ for which the absolute difference of said slope values b and $(b1 + 2\, c1\tau 1)$ satisfies $|b - b1 - 2\, c1\tau 1| \leq \delta b$, where $\delta b$ is a selected small positive value.

9. The method of claim 1, further comprising the steps of:

approximating said measured correlation function $AC(\tau)$ by a function $f(\tau;E)$ that is monotonically increasing for $\tau$ near said first time shift value $\tau = \tau 1$ and that has at least one time shift value for which $f(\tau;E) = 0$;

determining a time shift value $\tau = t_{f,E}$ for which $AC(t_{f,E}) = 0$; and estimating said tracking error by the relation $\Delta t_P = t_{f,E} + a/b$.

10. A method for estimating the correlation tracking error for a received composite signal that includes a distortion-free reference signal, the method comprising the steps of:

receiving an incoming signal s(t) that includes a known, distortion-free, digital reference signal $S_d(t)$ having a selected bit value interval of $\Delta t_{chip}$, and that may include at least one signal that distorts the reference signal;

forming a measured correlation function $AC(\tau)$ between the incoming signal s(t) and the known signal $S_d(t+\tau)$, where $\tau$ is a selected time shift value of the reference signal relative to the incoming signal;

selecting a first time shift value $\tau = \tau 1$ and a second time shift value $\tau 2$ for which there exists at least one third time shift value $\tau'$ satisfying $\tau 1 < \tau' < \tau 2$, $AC(\tau') > AC(\tau 1)$ and $AC(\tau') > AC(\tau 2)$;

approximating the measured correlation function $AC(\tau)$ for $\tau < \tau'$ by a first function $f(\tau;E)$;

approximating the measured correlation function $AC(\tau)$ for $\tau > \tau'$ by a second function $f(\tau;L)$;

determining at least one time shift value $\tau = t'_P$ satisfying $\tau 1 < t'_P < \tau 2$ for which $f(t'_P;E) = f(t'_P;L)$;

approximating a reference correlation function $AC(\tau;0)$ for the distortion-free signal for time shift values $\tau$ near a third time shift value $\tau 1' < \tau'$ by the relation $AC(\tau;0) \approx a + b\tau$, where b is a selected slope value and a is a selected number; and estimating a tracking error $\Delta t_P$ for the incoming signal s(t) from the parameters a, b, $\tau 1$, $\tau 2$, $\tau'$, $t'_P$ and knowledge of at least one of the functions $f(\tau;E)$ and $f(\tau;L)$.

11. The method of claim 10, further comprising the step of estimating said tracking error by the relation $\Delta t_P = t'_P + a/b - \Delta t_{chip}$.

12. The method of claim 10, further comprising the steps of:

selecting said function $f(\tau;E)$ to satisfy $f(\tau;E) = 0$ at a determinable time shift value $\tau = t'_E$; and estimating said tracking error by the relation $\Delta t_P = t'_E + a/b$.

13. The method of claim 10, further comprising the step of estimating said tracking error by at least one of the relations $\Delta t_P = t_P - t'_P$, and $\Delta t_P = t'_P - t_P$, where $t_P$ is approximately equal to a value of $\tau$ for which said measured correlation function $AC(\tau)$ attains a maximum value.

14. The method of claim 10, further comprising the steps of:

choosing said functions $f(\tau;E)$ and $f(\tau;L)$ to be equal to $f(\tau;E) = a1 + b1\tau$ and $f(\tau;L) = a2 + b2\tau$, where a1, b1, a2 and b2 are selected values; and estimating a tracking error $\Delta t_P$ for said incoming signal s(t) by the relation $\Delta t_P = (a2 - a1)/(b1 - b2) + a/b - \Delta t_{chip}$.

15. The method of claim 10, further comprising the steps of:

choosing said functions $f(\tau;E)$ and $f(\tau;L)$ to be equal to $f(\tau;E) = a1 + b1\tau + c1\tau^2$ and $f(\tau;L) = a2 + b2\tau + c2\tau^2$, where a1, b1, c1, a2, b2 and c2 are selected values with c1−c2 not zero; and estimating a tracking error $\Delta t_P$ for the incoming signal s(t) by the relation $$\Delta t_P = \{(b2-b1) \pm [(b2-b1)^2 - 4(a2-a1)((c2-c1)]^{1/2}\}/2(c2-c1) + a/b - \Delta t_{chip}.$$

16. The method of claim 15, further comprising the step of selecting said time shift value $\tau 1$ to be equal to a value of $\tau$ for which the absolute difference of said slope values b and $(b1 + 2\, c1\tau 1)$ satisfies $|b - b1 - 2\, c1\tau 1| \leq \delta b$, where $\delta b$ is a selected small positive value.

17. The method of claim 10, further comprising the steps of:

selecting said first function $f(\tau;E)$ monotonically increasing for $\tau$ near said first time shift value $\tau = \tau 1$ and to have at least one time shift value for which $f(\tau;E) = 0$;

determining a time shift value $\tau = t_{f,E}$ for which $f(t_{f,E}) = 0$; and estimating said tracking error by the relation $\Delta t_P = t_{f,E} + a/b$.

* * * * *